Patented Nov. 12, 1935

2,021,040

UNITED STATES PATENT OFFICE 2,021,040

PROTECTIVE COATING OF CARBIDES

John A. Zublin, Bel Air, Calif.

No Drawing. Application December 3, 1934,
Serial No. 755,769

6 Claims. (Cl. 219—10)

The present invention relates generally to welding operations, and more specifically to methods of preserving and protecting hard metallic wear-resistant substances as they are applied by welding to a relatively softer metal body which forms a support to carry the applied wear-resistant material.

In many types of cutting and digging tools it has been found desirable to use various metallic carbides to form cutting edges where great resistance to wear and abrasion is required. Because of the high cost of these metal carbides and their physical characteristics, it is customary to provide a body of a softer metal, usually iron or a ferrous alloy, which supports and carries one or more pieces of a hard carbide in proper position for cutting. Welding or brazing methods are used to attach the carbide particles to the body. Articles so made may include machine shop tools, bits and drills for earth-boring tools, and many other instruments, so it is to be understood that my invention is not limited by the particular use to which the finished tool is put. Nor is the invention limited to a particular carbide; but it will be described as applied to tungsten carbide because this carbide is most widely used and well shows the advantages of my invention, which may likewise be used with similar carbides, such as those of tantalum, columbium, chromium, molybdenum, and others.

Considerable difficulty has been encountered in that loss or decomposition of the carbide during the welding operation results in a product having not only a smaller amount of applied carbide than was started with, but having the carbide which is applied appreciably decreased in hardness when compared with the same material before application. These changes are caused by heat, by oxidation or hydrogenation, according to the nature of the flame to which the carbide is directly exposed, and by alloying of the carbide with the surrounding matrix.

These effects are particularly noticed with tungsten carbide, since the applied material starts as WC, the hardest form of the carbide, but after application contains a large percentage of $W_2C$, which is a much softer form. At temperatures encountered during welding operations, WC is somewhat unstable and has a tendency to break down into $W_2C$ and free carbon, in at least small amounts, and if the carbon is continuously removed, as by oxidation caused by an oxy-acetylene flame or by hydrogenation caused by an atomic hydrogen flame, or by alloying with the surrounding materials, the decomposition reaction is driven farther along until $W_2C$ is produced in detrimental quantities and the quality of the product is decidedly reduced. Even under the most favorable conditions it has heretofore been impossible to prevent the formation of an appreciable amount of $W_2C$.

Another reaction which occurs causes not only a decrease in the hardness of the facing but also a considerable loss in volume of the applied tungsten carbide: at welding temperatures, tungsten and iron alloy quite readily so that a substantial outer proportion of a carbide particle is dissolved or alloyed with the surrounding iron to form an iron-tungsten alloy which is of a considerably lower order of hardness than the tungsten carbide and which also reduces the amount of tungsten carbide present to serve as a cutting edge.

It will be apparent that, if these changes in composition of the applied carbide can be prevented, the carbide after application will be materially harder, since it will have retained its original characteristics.

It is thus a general object of my invention to provide a method of protecting hard metallic inserts during application to a softer metallic body whereby the metallic inserts retain throughout their initial hardness.

It is also an object of my invention to prevent decomposition of the carbides into softer forms, and so retain the applied material in its form of maximum hardness.

A further object of the invention is to prevent the alloying of carbide with the iron matrix so that the applied material does not form an iron alloy softer than the carbide.

These objects are accomplished in my novel method of welding together two pieces of dissimilar metals which readily alloy with one another, or one of which decomposes at high temperature, by interposing between them a film of a third metal in the form of a coating applied by any of several methods to one of the pieces, which third metal combines with the material of the coated piece only with relatively great difficulty, so that decomposition of the piece coated is retarded and alloying of the two pieces is almost completely prevented.

According to my preferred method, particles of carbide are cleaned of grease and dirt and are then placed in an electro-plating bath and a film of nickel is electro-deposited upon the particles. This nickel coating may vary widely in thickness to suit conditions, but need not be heavy enough to materially increase the weight or volume of the particles. As typical of such coating, but without limitation thereto, excellent results are obtained with a coating of such order of thickness as to increase the weight of crushed tungsten carbide particles about 1 to 5%.

Although spraying, dipping, painting, or other methods with or without the use of heat may be used if desired for coating the carbide pieces with nickel or other metal, I prefer electro-plating, since the deposited layer of metal is uniform in thickness, continuous, well bonded to the carbide, and the amount of metal so deposited can be very easily controlled by regulating the time, current, and concentration of electrolyte used in the electro-plating operation.

The welding operation may be carried out with any suitable type of apparatus and by any suitable method. As typical of one such method requiring minimum exposure to a welding flame, I have found it preferable to apply heat locally to the iron body so as to form a pool of molten base metal in which one or more pieces of carbide are placed. If a large area is to be covered, the extent of the pool is gradually enlarged to include an additional amount of the base metal, and additional particles of carbide are placed in the pool. After the source of heat is removed, the base metal solidifies and holds firmly embedded therein the particles of carbide which were placed in the molten metal.

The carbide thus welded to the ferrous body may be a single large piece, pre-formed if desired, or it may be several smaller pieces of crushed material. Regardless of the size of the individual pieces of carbide, they may be brought to the site of the welding and placed in the molten metal by any suitable means or method which does not expose them unduly to the direct heat of the welding flame, but for such length of time as they are necessarily exposed directly to the flame they are protected by the nickel coating which prevents oxidation or hydrogenation of the carbide.

For coating the carbide, there is used a metal such as copper or nickel that does not form carbides, or at least can be made to do so only with difficulty. Because of the undesirable effect of copper in steel, nickel is preferred. Since under the conditions here existing nickel forms no carbide and may be termed non-carbide forming, there is no tendency to absorb carbon from the tungsten carbide, with the result that the stability of WC is greatly increased and its decomposition to $W_2C$ is retarded. Further, nickel does not readily combine with the tungsten carbide in the presence of the large amount of iron in the matrix, but alloys with the iron, so that the nickel film disappears as such and forms an iron nickel alloy in the matrix, thus helping bond the particles of tungsten carbide to the body metal.

Tools produced by this method have been found to be definitely harder than any produced by other methods, when tested by resistance to grinding and by length of service in actual use.

Cross sections of samples made by my improved method have been polished, etched with several selective agents, and then examined under the microscope. Photo-micrographs of the samples at 300 diameters show a sharp, distinct boundary between the tungsten carbide particles and the steel matrix, indicating that very little or no alloying of iron and tungsten has occurred.

This can best be shown by comparisons with samples similarly prepared but using plain uncoated tungsten carbide, in which case there is always found a transition zone about each particle of tungsten carbide containing more or less $W_2C$. Across this transition zone there is a gradual uniform change from the tungsten carbide structure to the steel body structure, indicating that there is a blending or alloying with the matrix of the tungsten carbide. When the coated particles are used, the transition zone is comparatively much smaller, being in some cases so small as to practically disappear, and apparently is caused by the nickel film which alloys with the iron.

In the term "coating" as used in the claims I include any layer or covering of a third metal applied to the carbide pieces by any method such as electro-plating, spraying, dipping, painting, or others, whether or not heat is employed.

It is to be understood that the foregoing description of my invention is to be considered as illustrative of rather than restrictive upon the following claims, for departures from the foregoing may be made without leaving the scope of my invention.

I claim as my invention:

1. The method of attaching a piece of metallic carbide to a metallic body that includes coating the piece of carbide with substantially pure nickel, thus protecting the carbide piece against partial decomposition or alloying with the metallic body, and then welding the coated piece to the body.

2. The method of attaching a piece of tungsten carbide to a metallic body that includes coating the piece of tungsten carbide with substantially pure nickel, thus protecting the carbide piece against partial decomposition or alloying with the metallic body, and then welding the coated piece to the body.

3. The method of protecting a piece of tungsten carbide, during application to an iron body by welding, against partial decomposition or alloying with the iron body, that includes nickel-plating the individual piece of carbide.

4. The method of protecting a piece of hard metallic carbide, during application to an iron body by welding, against partial decomposition or alloying with the iron body, that includes nickel-plating the individual piece of carbide.

5. A piece of metallic tungsten carbide adapted to attachment to an iron body by welding, having a coating of substantially pure nickel to protect the carbide piece during the welding operation against chemical decomposition or alloying with the iron body.

6. A piece of hard metallic carbide adapted to attachment to an iron body by welding, having a coating of substantially pure nickel to protect the carbide piece during the welding operation against chemical decomposition or alloying with the iron body.

JOHN A. ZUBLIN.